US012795364B2

(12) United States Patent
Bhambani et al.

(10) Patent No.: US 12,795,364 B2
(45) Date of Patent: Nov. 10, 2026

(54) ACCESS CONTROL FOR SIGNALING TRAFFIC BETWEEN NETWORK FUNCTIONS DEPLOYED ON EDGE AND IN THE CLOUD

(71) Applicant: Cisco Technology, Inc., San Jose, CA (US)

(72) Inventors: Sunil Bhambani, Pune (IN); Praveen Joseph, San Jose, CA (US); Era Gupta, Bengaluru (IN); Kellia Surendran Suriya Ganesh, Bangalore (IN); Sangeetha Shyamnath, Semmencherry (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 267 days.

(21) Appl. No.: 18/325,499

(22) Filed: May 30, 2023

(65) Prior Publication Data

US 2024/0406727 A1 Dec. 5, 2024

(51) Int. Cl.

*H04L 29/00* (2006.01)
*H04W 8/18* (2009.01)

(Continued)

(52) U.S. Cl.

CPC ........... *H04W 12/08* (2013.01); *H04W 8/186* (2013.01); *H04W 12/037* (2021.01); *H04W 12/72* (2021.01)

(58) Field of Classification Search

CPC ... H04W 12/08; H04W 12/72; H04W 12/037; H04W 8/186

(Continued)

(56) References Cited

U.S. PATENT DOCUMENTS

2019/0116186 A1* 4/2019 Viswanathan ........ H04L 63/101
2020/0036599 A1* 1/2020 Savov ..................... H04L 47/70

(Continued)

FOREIGN PATENT DOCUMENTS

WO 2022152436 A1 7/2022
WO 2022218534 A1 10/2022

*Primary Examiner* — Jeffrey C Pwu
*Assistant Examiner* — Michael D Anderson
(74) *Attorney, Agent, or Firm* — Edell, Shapiro & Finnan, LLC

(57) ABSTRACT

Methods and systems provide authentication of signaling from on-premise network(s) to a cloud network to prevent unauthorized access to device information belonging to another enterprise/on-premise network. Methods involve a cloud proxy service obtaining a request originating from a source network function deployed in an on-premise network and destined for a destination network function deployed in a cloud network. These methods further involve determining whether the source network function is associated with an enterprise network based on a unique identifier extracted from the request. The unique identifier is indicative of a particular enterprise network. The methods further involve providing the request to the destination network function based on determining that the source network function is associated with the particular enterprise network and blocking the request from propagating to the destination network function based on determining that the source network function is not associated with the particular enterprise network.

20 Claims, 5 Drawing Sheets

(51) Int. Cl.
*H04W 12/037* (2021.01)
*H04W 12/08* (2021.01)
*H04W 12/72* (2021.01)

(58) Field of Classification Search
USPC .............................................................. 725/5
See application file for complete search history.

(56) References Cited

U.S. PATENT DOCUMENTS

| | | | | |
|---|---|---|---|---|
| 2020/0366677 | A1 | 11/2020 | Draznin et al. | |
| 2022/0286860 | A1 | 9/2022 | Howe et al. | |
| 2023/0017423 | A1 * | 1/2023 | Guntupalli .......... | H04W 68/005 |
| 2023/0073863 | A1 | 3/2023 | Nicoara et al. | |

* cited by examiner

ACCESS CONTROL FOR SIGNALING TRAFFIC BETWEEN NETWORK FUNCTIONS DEPLOYED ON EDGE AND IN THE CLOUD

TECHNICAL FIELD

The present disclosure generally relates to computer networks and systems.

BACKGROUND

Mobile communication networks provide data and voice services to their subscribers. A subscriber registers with a mobile communication network operator to establish a connection with the mobile communication network. The mobile network operators (MNOs) provide voice and data services to user equipment (UEs) using various network connectivity services such as a fifth generation (5G) network or a fourth generation (4G) network. Some of these connectivity providing services offered by the MNOs may be segmented for various enterprises, for example, to provide enterprise specific network slices. Segmented services may be services offered by various third parties such as applications and/or enterprise domains. Access to various enterprise services is enabled through these network slices provided or hosted by the MNO, also sometimes referred to as a service provider (SP) or MNO/SP.

DESCRIPTION OF EXAMPLE EMBODIMENTS

Overview

Figure 1:
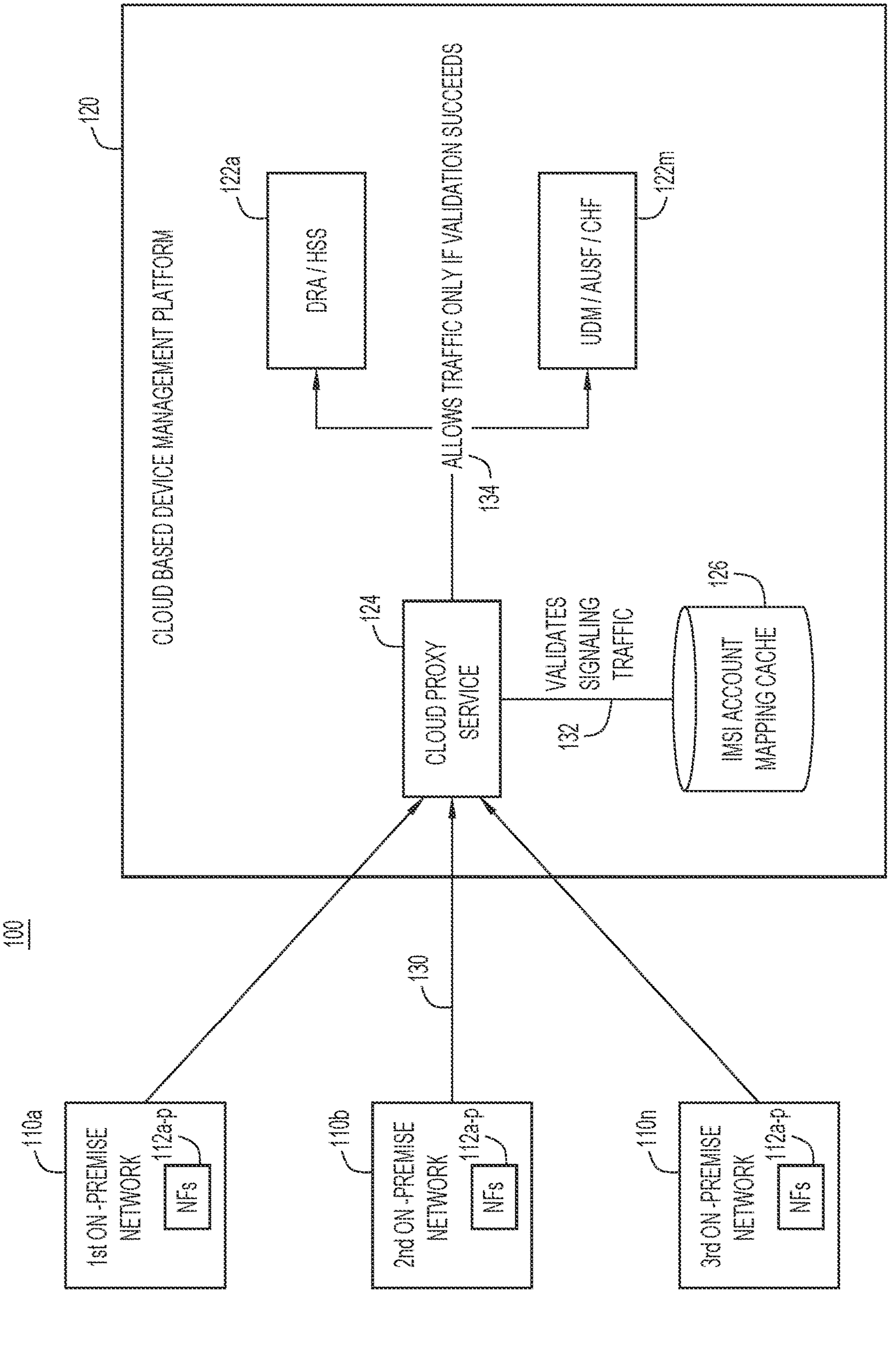
FIG. 1 is a block diagram illustrating an environment in which a cloud proxy service is deployed for controlling access from on-premise networks to network functions deployed in a cloud network, according to an example embodiment.

Briefly, methods are presented for authenticating signaling traffic from an on-premise network to a cloud network to prevent unauthorized access to device information belonging to another enterprise network (another on-premise network).

In one form, a method is provided that includes a cloud proxy service obtaining a request originating from a source network function deployed in an on-premise network and destined for a destination network function deployed in a cloud network. The method further involves determining whether the source network function is associated with an enterprise network based on a unique identifier extracted from the request. The unique identifier is indicative of a particular enterprise network among a plurality of enterprise networks. The method further involves providing the request to the destination network function based on determining that the source network function is associated with the particular enterprise network and blocking the request from propagating to the destination network function based on determining that the source network function is not associated with the particular enterprise network.

Example Embodiments

Mobile network operators (MNOs) provide connectivity service to the UEs using various wired and/or wireless cellular networks which may include but are not limited to 3rd Generation Partnership Project (3GPP) fourth generation (4G)/Long Term Evolution (LTE) network and fifth generation (5G) cellular network. Network connectivity services may be split into various network functions (NFs), some of which are hosted in a cloud network or in a cloud (network as a service). In particular, in providing network connectivity to the UEs, some NFs are hosted in the cloud network while other NFs are hosted by an on-premises network (sometimes referred to as an "edge"). That is, a connectivity providing service is established using a plurality of network functions that include a source network function and a destination network function.

In the context of 4G and/or 5G system architectures, any NF may initiate a request towards another NF if there is a reference point defined between the two NFs. In the context of 5G as a service (5GaaS), for example, the NFs deployed at an edge or in the on-premise network may initiate requests towards the NFs deployed in the cloud network (provider network).

With the advent of private 5G (P5G) network, the number of edge networks connecting to a cloud increased. If a cloud solution like Internet of Things (IoT) control center does not filter the request from a particular edge network to limit subscriber data to the requesting edge network then there is a potential security problem of any bad actor or entity obtaining access to subscriber data of multiple edge networks by compromising a single edge network.

In addition to this, one of the key features provided by some P5G networks is the ability for a device to roam within an enterprise's edge deployments. However, there are security issues with P5G and other on-premise network deployments in that one edge can access information about devices owned by a different enterprise (an on-premise network or an edge owed by another enterprise).

In cloud solutions such as the IoT control center, multiple edges owned by different enterprises communicates with the IoT control center. The IoT control center authenticates and authorizes requests from edge networks to prevent unauthorized access to device information belonging to another enterprise.

The techniques presented herein provide for a subscriber and enterprise mapping for authorizing access to device information. Specifically, signaling traffic received from an edge network is validated in the cloud using cache and/or other datastore(s) by performing a golden path check. If the subscriber belongs to the same edge network, the request is propagated to the network functions (NFs) deployed in the cloud. If the subscriber does not belong to the same edge network, the validation fails and the cloud network does not allow the request to be propagated to the NFS in the cloud.

The techniques presented herein provide for storing subscriber and account mappings in a cache store for access control. In one or more example embodiments, subscriber and account mappings is a mapping between a device and an enterprise. The terms “enterprise” and “account” are used interchangeably throughout the disclosure. The techniques further provide a method for retrieving the subscriber information (i.e., a unique identifier) from a request that originated from an edge network and using the information to validate signaling traffic coming to the cloud based on the subscriber and account mapping in the cache store (and/or another datastore(s) by performing a golden path check). The techniques further provide for rejecting requests if the validation fails; thus, protecting subscriber data from being available to a bad actor by compromising only a single edge network. The techniques further provide a golden path if subscriber and account mapping information cannot be retrieved from the cache store.

FIG. 1 is a diagram illustrating an environment 100 in which a cloud proxy service is deployed for controlling access from on-premise networks to network functions deployed in a cloud network, according to an example embodiment. The environment 100 includes a plurality of on-premise networks 110*a-n* such as a first on-premise network 110*a*, a second on-premise network 110*b*, and a third on-premise network 110*n*. The environment 100 further includes a cloud network 120 in which a cloud-based device management platform is deployed.

The notations 1, 2, 3, . . . n; a, b, c, . . . n; “a-n”, “a-b”, and the like illustrate that the number of elements can vary depending on a particular implementation and is not limited to the number of elements being depicted or described. Moreover, this is only examples of various components of the environment 100, and the number and types of components, functions, etc. may vary based on a particular deployment and use case scenario. For example, while example embodiments presented below describe a network connectivity providing service, the disclosure is not limited thereto. The techniques presented herein may be applicable to various software as a service (Saas) technologies, which are distributed between one or more edge networks and the cloud network 120.

The plurality of on-premise networks 110*a-n*, each host one or more network functions (edge NFs 112*a-p*). The edge NFs 112*a-p* may include but are not limited to Access and Mobility Management Function (AMF) and a Session Management Function (SMF). Generally, the AMF is responsible for handling connections and mobility management tasks. The SMF is responsible for handling session management. The SMF interacts with a decoupled data plane, creating, updating, and removing Protocol Data Unit (PDU) sessions, and managing session context with one or more User Plane Functions (UPFs) (not shown). Another example of an edge NF associated with the 4G network is a Mobility Management Entity (MME) responsible for handling connections and mobility management tasks.

The plurality of on-premise networks 110*a-n* are enterprise networks or network domains at various locations. The plurality of on-premise networks 110*a-n* may each belong to a different enterprise or service provider i.e., a private 5G network provider. The plurality of on-premise networks 110*a-n* are referred to as edges or edge networks, interchangeably. The plurality of on-premise networks 110*a-n* connect to the cloud network 120.

In one example embodiment, the cloud network 120 deploys a cloud-based device management platform such as Internet of Things (IoT) control center. In a cloud solution such as the IoT control center, multiple edges owned by different enterprises communicates with the IoT control center. It is important to authenticate and authorize the requests from an edge network to prevent unauthorized access to device information belonging to another enterprise. The cloud network 120 includes cloud NFs 122*a-m*, a cloud proxy service 124, and a mapping cache 126.

The cloud network 120 hosts some of the NFs for services provided by various enterprises i.e., the cloud NFs 122*a-m*. For example, the cloud NFs 122*a-m* of a connectivity providing service such as a diameter routing agent (DRA) and home subscriber service (HSS) of a 3G or 4G network are referred to as a first cloud NF 122*a* and a unified data management (UDM) function, authentication server function (AUSF), and a charging function (CHF) of a 5G network or the private 5G network (P5G) are referred to as a second cloud NF 122*m*.

The AUSF is responsible for authenticating subscribers, the UDM is responsible for authentication credentials generation and subscription identification handling, a Unified Data Repository (UDR), not shown, stores subscription related information and/or policies, and the CHF is responsible for charging and/or billing subscribers for services such as voice calls and/or data usage that are provided by a mobile network provider (e.g., by one of the enterprises). The HSS of the 4G network handles subscriber profiles and the DRA handles real-time routing capabilities to ensure that messages are routed among correct elements in a network. These are just some non-limiting examples of various cloud NFs 122*a-m* that may be hosted by the cloud network 120. The network functions establish a connectivity providing service for one or more user devices (UEs).

In the above example, the cloud NFs 122*a-m* are decoupled from the edge NFs 112*a-p*. Entities in the environment 100 are connected to one another via various network interfaces such as but not limited to the ones defined in 3GPP 5G standards (e.g., N8, N10, N12, and N40 as prescribed, at least in part by 3GPP Technical Specification (TS) 23.501, etc.). With the advent of P5G, multiple edge networks connect to the same management platform. As such, the cloud proxy service 124 filters requests from the edge NFs 112*a-p* to ensure that these requests are destined for a cloud NF that is associated with the same enterprise. That is, the on-premise networks 110*a-n* are prevented from accessing information about network devices that are owned by a different enterprise.

Specifically, the cloud proxy service 124 intercepts signaling traffic destined for the cloud NFs 122*a-m* and validates that the subscriber belongs to the same enterprise (subscriber and account mapping). If the validation fails, the cloud proxy service 124 blocks the request from propagating to the target cloud NF i.e., drops the request and/or sends an error message to the requesting edge NF (i.e., the subscriber). The cloud proxy service 124 extracts a unique identifier such as an international mobile subscriber identity (IMSI) from the request and checks a subscriber and an enterprise mapping information stored in a cache store i.e., the mapping cache 126. The cloud proxy service 124 uses IMSI to validate that the device belongs to the same enterprise network from which the request originated.

For example, the first on-premise network 110*a* and the second on-premise network 110*b* are owned by a first enterprise that provides a P5G network connectivity service. The third on-premise network 110*n* is owned by a second enterprise that provides an LTE network connectivity service. The on-premise networks 110*a-n* have access to the first cloud NF 122*a* and the second cloud NF 122*m*, both hosted in the cloud network 120. The first cloud NF 122*a* and the second cloud NF 122*m* are shared network functions i.e., that may host subscriber information for different enterprises and/or service providers. The cloud proxy service 124 validates requests originating from the edge NFs 112*a-p* by determining whether the edge from where the request originated belongs to the enterprise associated with the IMSI and accepts or rejects the request accordingly.

Specifically, at 130, a first request from the first on-premise network 110*a* is received by the cloud network 120 and is intercepted by the cloud proxy service 124. The cloud proxy service 124 extracts the unique identifier (IMSI) from the request and at 132, validates the unique identifier with IMSI account information stored in the mapping cache 126. Since the unique identifier belongs to the first enterprise from which the request originated, at 134, the request is propagated to the second cloud NF 122*m*. On the other hand, a request from the third on-premise network 110*n* for the same IMSI is blocked (i.e., dropped) by the cloud proxy service 124 because the unique identifier (IMSI) in the request is not associated with the second enterprise.

Figure 2:
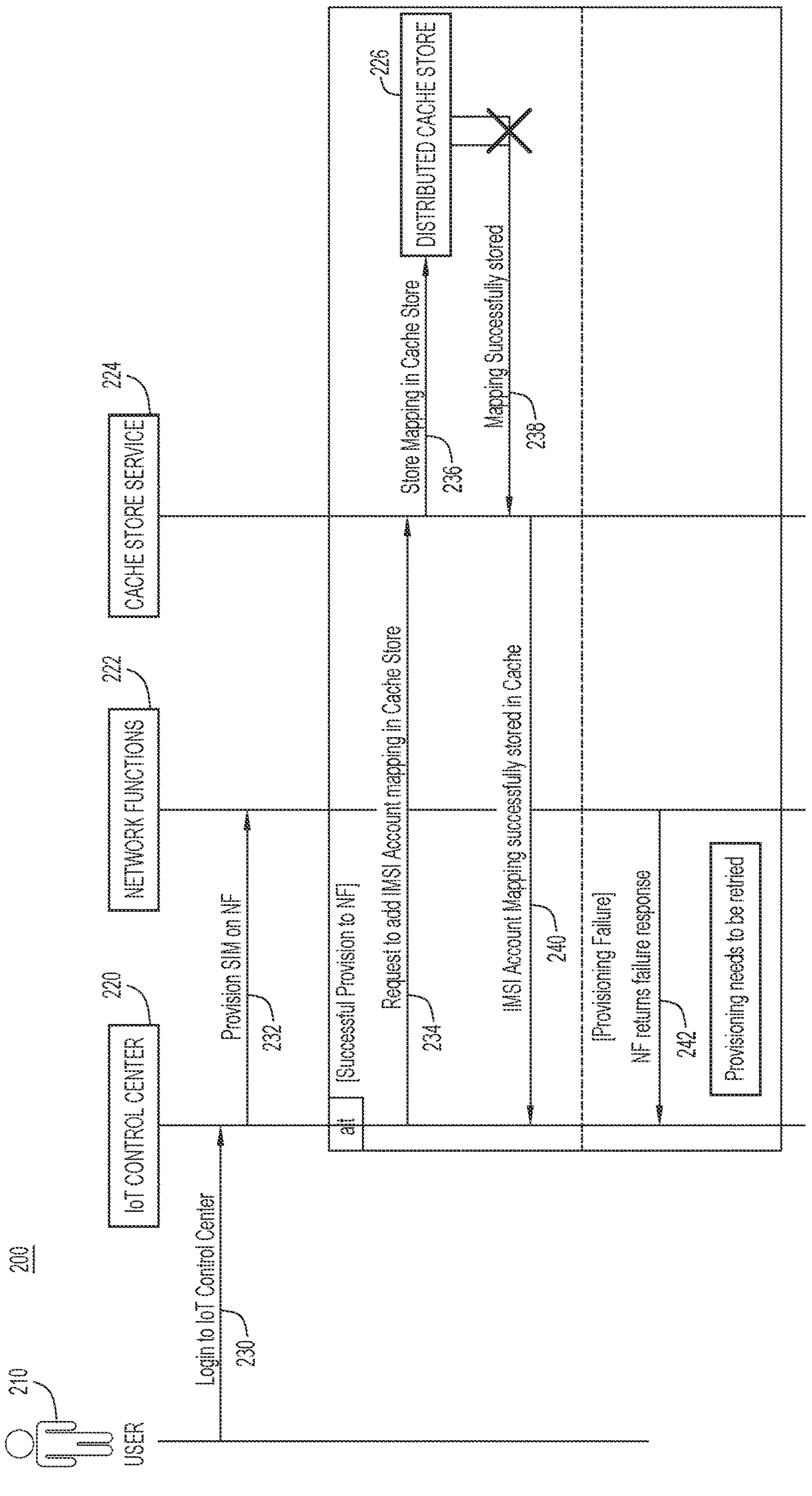
FIG. 2 is a flow diagram illustrating a method of generating device account mappings in a distributed cache for providing access to a cloud network function, according to an example embodiment.

With continued reference to FIG. 1, FIG. 2 is a flow diagram illustrating a method 200 of generating device account mappings in a distributed cache for providing access to a cloud network function, according to an example embodiment. The method 200 involves a user 210 that is provisioning a user device/UE. Provisioning may be performed by a service provider and/or an enterprise user using an IoT control center 220 such as a cloud-based device management platform in the cloud network 120 of FIG. 1.

As part of user device provisioning, user information (subscriber information) is stored on one or more cloud NFs (network functions 222). such as the HSS of 4G network or the UDM of 5G network. This action also triggers storing of the unique identifier and account mapping (IMSI and enterprise mapping) into a distributed cache store 226, for example, using a cache store service 224.

The method 200 involves populating the distributed cache store 226 with IMSI account mappings. That is, when a user device i.e., a subscriber identity module (SIM) card, is provisioned in the IoT control center 220 for P5G enabled operator, a mapping of a unique identifier to the respective P5G enabled enterprise (e.g., IMSI and account information) is stored in the distributed cache store 226 for a quick retrieval.

Specifically, at 230, a user logs into the IoT control center 220 to provision the new SIM card and associate the device with an enterprise.

At 232, the IoT control center 220 associates the device with an enterprise and provisions the new SIM card on the network functions 222. As an example, the new device and subscriber information is stored in the HSS and/or UDM. The new device and subscriber information includes a unique identifier e.g., the IMSI. The provisioning is performed to establish a network connectivity providing service for the user device/UE.

If the provisioning with the network functions 222 is successful, at 234, the IoT control center 220 sends a request to the cache store service 224 to store a mapping of the unique identifier and subscriber information (enterprise) in the distributed cache store 226. The mapping is indicative of the device (identified using IMSI) being associated with the particular enterprise i.e., a mapping in which IMSI is associated with a particular enterprise. At 236, the cache store service 224 stores the mapping of the unique identifier (e.g., IMSI) with the subscriber information in the distributed cache store 226.

At 238, the distributed cache store 226 informs the cache store service 224 that the mapping was successfully stored, which in turn, at 240, informs the IoT control center 220 of the same.

On the other hand, if the provisioning at 232 failed, at 242, the network functions 222 inform the IoT control center 220 of such failure and the IoT control center 220 may determine whether to retry and/or to inform the user 210 of the same.

Figure 3:
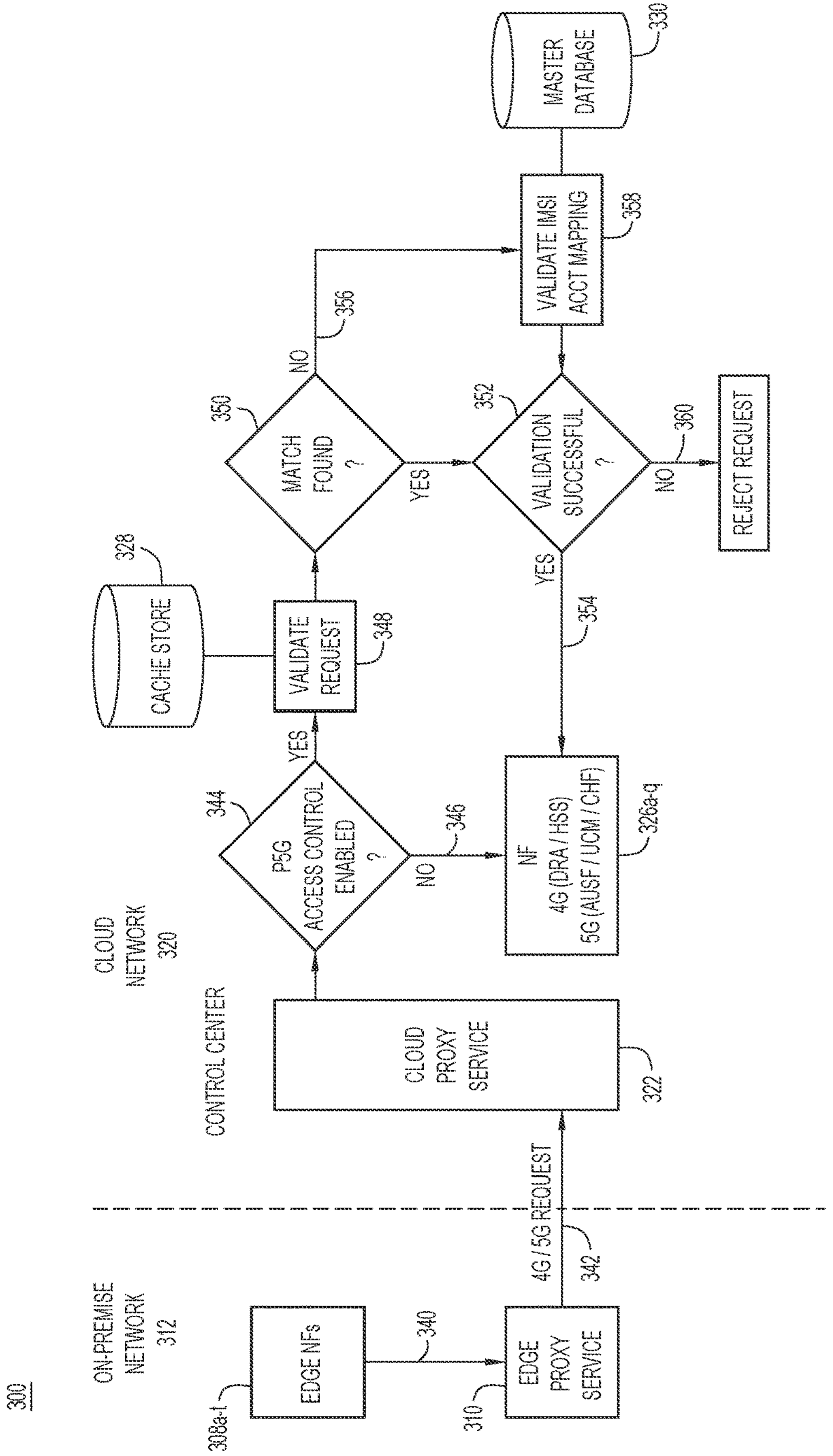
FIG. 3 is a flow diagram illustrating a method of authenticating signaling traffic from an on-premise network to a network function deployed in a cloud network, according to an example embodiment.

With continued reference to FIGS. 1 and 2, FIG. 3 is a flow diagram illustrating a method 300 of authenticating signaling traffic from an on-premise network to a network function deployed in a cloud network, according to an example embodiment. The method 300 involves edge network functions 308*a-t* that may generate one or more requests, an edge proxy service 310 deployed in an on-premise network 312 that communicates the requests to a control center deployed in a cloud network 320. The cloud network 320 includes a cloud proxy service 322, cloud NFs 326*a-q*, a cache store 328, and a master database 330 i.e., master datastore and/or other datastores.

At 340, one of the edge network functions 308*a-t* sends a request to the edge proxy service 310.

At 342, a 4G request or a 5G request (the request) is received by the cloud proxy service 322. The cloud proxy service 322 and the edge proxy service 310 add a security layer between the edge (the on-premise network 312 and the cloud network 320. As part of the security validation, the edge from which the request originated and an enterprise (the account) owning the edge are identified. This information is then utilized to perform the validation that the IMSI in the request is associated with the enterprise's edge from which the request originated.

Specifically, at 344, the cloud proxy service 322 determines whether P5G access control is enabled. If the P5G access control is not enabled, at 346, the request is provided to one or more of the cloud NFs 326*a-q*. If the P5G access control is enabled, at 348, the cloud proxy service 322 proceeds to validate the request. Specifically, the cloud proxy service 322 searches the cache store 328 for IMSI account mapping. That is, the cloud proxy service 322 searches for the account identifier from the request in the cache store 328. At 350, the cloud proxy service 322 verifies whether the account identifier from the request matches IMSI and account mapping stored in the cache store 328. If a match is found (yes at 350), at 352, the cloud proxy service 322 determines that validation is successful and that the IMSI is associated with the account identifier (a particular enterprise) from which the request originated. As such, at 354, the request is provided to one or more of the cloud NFs 326*a-q*.

On the other hand, if the match is not found at 350 i.e., IMSI and account mapping information that matches the IMSI in the request is not found in the cache store 328, additional checks may be performed to ensure that the IMSI is not associated with the enterprise. For example, the cloud proxy service 322 may execute a golden path that checks other datastores for account mapping (i.e., whether the user device is associated with an enterprise).

Specifically, at 356, the cloud proxy service 322 determines that no match is found and proceeds to check the master database 330, at 358. The master database 330 stores provisioning information including identification information that identifies mobile devices associated with the enterprise. The method 300 then proceeds to 352, in which a determination whether the validation is a success or not is made. If the account identifier (enterprise) is associated with IMSI (a particular user device) in the master database 330, the validation is a success and at 354, the request is provided to one or more of the cloud NFs 326*a-q*.

If IMSI account mapping for the user device is not found in the master database 330, at 360, the request is rejected or blocked.

In one example embodiment, the cache store 328 is periodically synchronized with the master database 330 to ensure that the cache store 328 is accurate and is updated with subscriber and account mappings stored in the master database 330.

In one example embodiment, at 360, a failure response may be returned when access to the cloud NFs 326*a-q* is denied. In case of failure, the control center rejects access to the NFs 326*a-q* with the following exemplary response:

5G Validation Failure Response

```
{
  "title": "FORBIDDEN",
  "status": 403,
  "detail": "Requesting account is not authorized to access requested IMSI",
  "cause": "SERVING_NETWORK_NOT_AUTHORIZED"
}
```

The techniques presented herein enable multiple edges to be connected to the same cloud network i.e., the same IoT control center without compromising subscriber data. Security is provided without impacting roaming of user devices between edge networks of the same enterprise. The techniques presented herein do not impact performance by using a cache store for subscriber and account (device and enterprise) mapping, which allows for quick access and retrieval. Moreover, no additional information needs to be included in the requests because unique identifier such as IMSI may already be included in 5G requests and/or 4G requests. This unique identifier is simply extracted from the request to determine subscriber and account mapping. The techniques presented herein further enable synchronization with a cache store.

Figure 4:
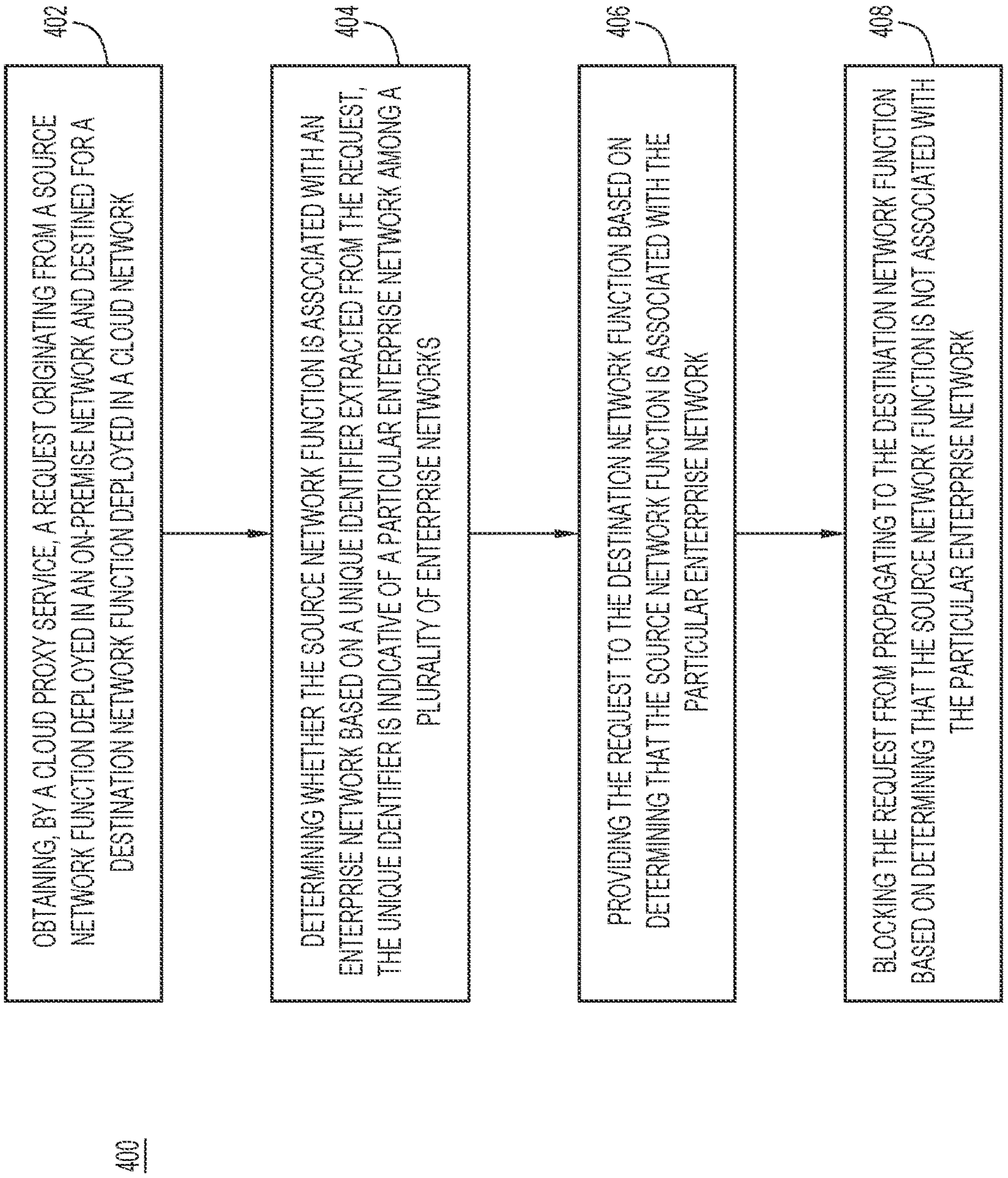
FIG. 4 is a flowchart illustrating a method of validating a request from an edge network destined for a network function deployed in a cloud network, according to an example embodiment.

FIG. 4 is a flow diagram illustrating a method 400 of validating a request from an edge network destined for a network function deployed in a cloud network, according to an example embodiment. The method 400 may be implemented by the cloud proxy service 124 of FIG. 1.

At 402, the method 400 involves obtaining a request originating from a source network function deployed in an on-premise network and destined for a destination network function deployed in a cloud network.

At 404, the method 400 involves determining whether the source network function is associated with an enterprise network based on a unique identifier extracted from the request. The unique identifier is indicative of a particular enterprise network among a plurality of enterprise networks.

At 406, the method 400 involves providing the request to the destination network function based on determining that the source network function is associated with the particular enterprise network.

At 408, the method 400 involves blocking the request from propagating to the destination network function based on determining that the source network function is not associated with the particular enterprise network.

In one form, the operation 404 of determining whether the source network function is associated with the particular enterprise network may include extracting the unique identifier from the request and determining whether the unique identifier matches a subscriber and account mapping for the particular enterprise network stored in a mapping cache deployed in the cloud network.

In one instance, the operation 404 of determining whether the source network function is associated with the particular enterprise network may further involve the following operations. Based on determining that the unique identifier is not stored in the mapping cache, providing, to a master datastore, a golden path request that includes the unique identifier and determining whether the unique identifier is stored in the master datastore as a subscriber identifier for an account associated with the particular enterprise network.

In one or more example embodiments, the unique identifier may be an international mobile subscriber identity (IMSI) using which a subscriber is associated with the respective enterprise network.

In one form, the method 400 may further involve obtaining a provisioning request for provisioning a subscriber identity module (SIM), extracting the unique identifier from the provisioning request, and storing the unique identifier in association with the particular enterprise network in a mapping cache for validating signaling traffic from one or more on-premise networks.

In one instance, in the method 400, the mapping cache may be a distributed cache hosted in the cloud network. The method 400 may further involve determining that the unique identifier is stored in the distributed cache.

In one or more example embodiments, the source network function and the destination network function may be functions of a private fifth-generation network as a service (private 5GaaS).

In another instance, the source network function and the destination network function may be functions of a fourth-generation network as a service (4GaaS).

In one form, the method 400 may further involve establishing a connectivity providing service using a plurality of network functions that include the source network function and the destination network function. The plurality of network functions may be deployed in the cloud network and in the on-premise network. The cloud network may host a device management service that includes one or more of a data management function, an authentication server function, a charging function, or a home subscriber server.

In another form, the operation 402 of obtaining the request originating from the source network function deployed in the on-premise network may include intercepting, by the cloud proxy service hosted in the cloud network, the request in order to validate signaling traffic from the source network function.

Figure 5:
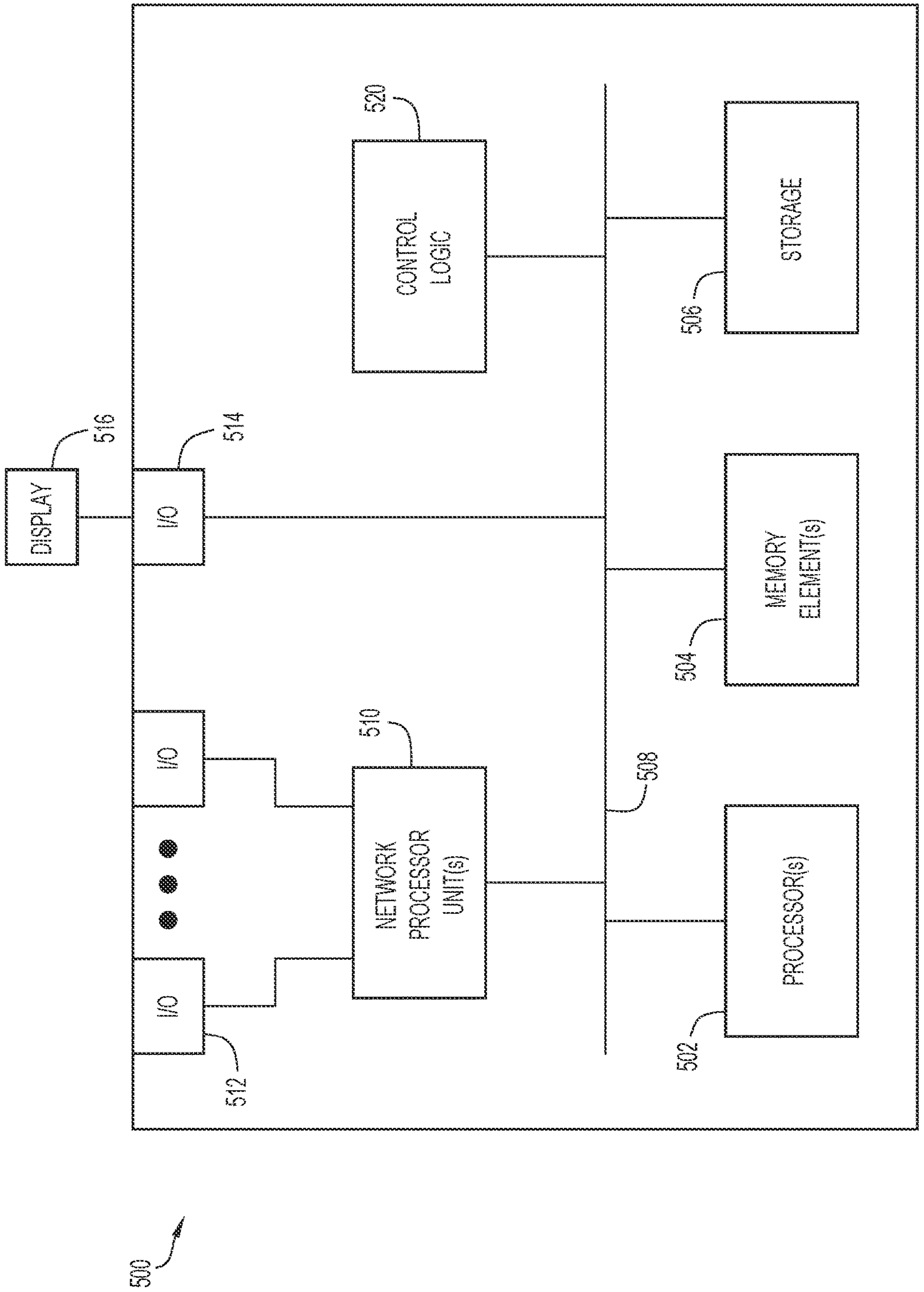
FIG. 5 is a hardware block diagram of a computing device that may perform functions associated with any combination of operations in connection with the techniques depicted and described in FIGS. 1-4, according to various example embodiments.

FIG. 5 is a hardware block diagram of a computing device 500 that may perform functions associated with any combination of operations in connection with the techniques depicted in FIGS. 1-4, according to various example embodiments, including, but not limited to, operations of a cloud proxy service. Further, the computing device 500 may be representative of one of network devices that host various network functions. It should be appreciated that FIG. 5 provides only an illustration of one example embodiment and does not imply any limitations with regard to the environments in which different embodiments may be implemented. Many modifications to the depicted environment may be made.

In at least one example embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element (s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various example embodiments, network processor unit (s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface (s) 512 may include suitable interfaces for receiving, transmitting, and/or otherwise communicating data and/or information in a network environment.

I/O interface(s) 514 allow for input and output of data and/or information with other entities that may be connected to the computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like, shown at 516 in FIG. 5.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided that may deploy the cloud proxy service 124 of FIG. 1 or the computing device 500 of FIG. 5. The apparatus includes a memory, a network interface configured to enable network communications and a processor. The processor is configured to perform various operations. The operations include a cloud proxy service obtaining a request originating from a source network function deployed in an on-premise network and destined for a destination network function deployed in a cloud network and determining whether the source network function is associated with an enterprise network based on a unique identifier extracted from the request. The unique identifier is indicative of a particular enterprise network among a plurality of enterprise networks. The operations include providing the request to the destination network function based on determining that the source network function is associated with the particular enterprise network and blocking the request from propagating to the destination network function based on determining that the source network function is not associated with the particular enterprise network.

In yet another example embodiment, one or more non-transitory computer readable storage media encoded with instructions are provided. When the media is executed by a processor, the instructions cause the processor to execute a method involving a cloud proxy service obtaining a request originating from a source network function deployed in an on-premise network and destined for a destination network function deployed in a cloud network and determining whether the source network function is associated with an enterprise network based on a unique identifier extracted from the request. The unique identifier is indicative of a particular enterprise network among a plurality of enterprise networks. The method further involves providing the request to the destination network function based on determining that the source network function is associated with the particular enterprise network and blocking the request from propagating to the destination network function based on determining that the source network function is not associated with the particular enterprise network.

In yet another example embodiment, a system is provided that includes the device and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages'. 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, datastores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a cloud proxy service hosted in a cloud network, comprising:

provisioning user devices by storing, in a mapping cache deployed in the cloud network, subscriber and account mappings of unique user device identifiers of the user devices of subscribers to corresponding ones of account identifiers of enterprise networks to which the user devices respectively belong;

obtaining a request originating from a source network function deployed in an on-premise network and destined for a destination network function deployed in the cloud network;

determining whether the source network function is associated with an enterprise network based on a unique user device identifier extracted from the request and on the subscriber and account mappings, wherein the unique user device identifier is indicative of a particular enterprise network among a plurality of enterprise networks;

when the unique user device identifier is not stored in the mapping cache:

providing, to a master datastore that stores master database subscriber and account mappings, and that is periodically synchronized with the mapping cache to ensure that the mapping cache is updated with the master database subscriber and the account mappings, a golden path request that includes the unique user device identifier; and determining whether the unique user device identifier is stored in the master datastore for an account associated with the particular enterprise network;

providing the request to the destination network function based on determining that the source network function is associated with the particular enterprise network; and blocking the request from propagating to the destination network function based on determining that the source network function is not associated with the particular enterprise network.

2. The method of claim 1, wherein determining whether the source network function is associated with the particular enterprise network includes:

extracting the unique user device identifier from the request; and determining whether the unique user device identifier matches a subscriber and account mapping that includes an account identifier for the particular enterprise network stored in the mapping cache.

3. The method of claim 1, wherein the unique user device identifier is an international mobile subscriber identity (IMSI) for a user device which is associated with the particular enterprise network.

4. The method of claim 1, wherein:

provisioning includes obtaining a provisioning request for provisioning a subscriber identity module (SIM);

extracting the unique user device identifier from the provisioning request; and storing the unique user device identifier in association with an account identifier of the particular enterprise network in the mapping cache for validating signaling traffic from one or more on-premise networks.

5. The method of claim 4, wherein the mapping cache is a distributed cache hosted in the cloud network and further comprising:

determining, by the cloud proxy service, that the unique user device identifier is stored in the distributed cache.

6. The method of claim 1, wherein the source network function and the destination network function are functions of a private fifth-generation network as a service (private 5GaaS).

7. The method of claim 1, wherein the source network function and the destination network function are functions of a fourth-generation network as a service (4GaaS).

8. The method of claim 1, further comprising:

establishing a connectivity providing service using a plurality of network functions that include the source network function and the destination network function, wherein the plurality of network functions are deployed in the cloud network and in the on-premise network and wherein the cloud network hosts a device management service that includes one or more of: a data management function, an authentication server function, a charging function, or a home subscriber server.

9. The method of claim 1, wherein obtaining the request originating from the source network function deployed in the on-premise network includes:

intercepting, by the cloud proxy service hosted in the cloud network, the request, to validate signaling traffic from the source network function.

10. An apparatus comprising:

a memory;

a network interface configured to enable network communications; and a processor, wherein the processor is configured to perform operations, by a cloud proxy service hosted on a cloud network, comprising:

provisioning user devices by storing, in a mapping cache deployed in the cloud network, subscriber and account mappings of unique user device identifiers of the user devices of subscribers to corresponding ones of account identifiers of enterprise networks to which the user devices respectively belong;

obtaining a request originating from a source network function deployed in an on-premise network and destined for a destination network function deployed in the cloud network;

determining whether the source network function is associated with an enterprise network based on a unique user device identifier extracted from the request and on the subscriber and account mappings, wherein the unique user device identifier is indicative of a particular enterprise network among a plurality of enterprise networks;

when the unique user device identifier is not stored in the mapping cache:

providing, to a master datastore that stores master database subscriber and account mappings, and that is periodically synchronized with the mapping cache to ensure that the mapping cache is updated with the master database subscriber and the account mappings, a golden path request that includes the unique user device identifier; and determining whether the unique user device identifier is stored in the master datastore for an account associated with the particular enterprise network;

providing the request to the destination network function based on determining that the source network function is associated with the particular enterprise network; and blocking the request from propagating to the destination network function based on determining that the source network function is not associated with the particular enterprise network.

11. The apparatus of claim 10, wherein the processor is configured to determine whether the source network function is associated with the particular enterprise network by:

extracting the unique user device identifier from the request; and determining whether the unique user device identifier matches a subscriber and account mapping that includes an account identifier for the particular enterprise network stored in the mapping cache deployed in the cloud network.

12. The apparatus of claim 10, wherein the unique user device identifier is an international mobile subscriber identity (IMSI) for a user device which is associated with the particular enterprise network.

13. The apparatus of claim 10, wherein the processor is further configured to perform:

provisioning by obtaining a provisioning request for provisioning a subscriber identity module (SIM);

extracting the unique user device identifier from the provisioning request; and storing the unique user device identifier in association with an account identifier of the particular enterprise network in the mapping cache for validating signaling traffic from one or more on-premise networks.

14. The apparatus of claim 13, wherein the mapping cache is a distributed cache hosted in the cloud network and the processor is further configured to perform:

determining, by the cloud proxy service, that the unique user device identifier is stored in the distributed cache.

15. One or more non-transitory computer readable storage media encoded with instructions that, when executed by a processor of a cloud proxy service hosted in a cloud network, cause the processor to execute a method comprising:

provisioning user devices by storing, in a mapping cache deployed in the cloud network, subscriber and account mappings of unique user device identifiers of the user devices of subscribers to corresponding ones of account identifiers of enterprise networks to which the user devices respectively belong;

obtaining a request originating from a source network function deployed in an on-premise network and destined for a destination network function deployed in the cloud network;

determining whether the source network function is associated with an enterprise network based on a unique user device identifier extracted from the request and on the subscriber and account mappings, wherein the unique user device identifier is indicative of a particular enterprise network among a plurality of enterprise networks;

when the unique user device identifier is not stored in the mapping cache:

providing, to a master datastore that stores master database subscriber and account mappings, and that is periodically synchronized with the mapping cache to ensure that the mapping cache is updated with the master database subscriber and the account mappings, a golden path request that includes the unique user device identifier; and determining whether the unique user device identifier is stored in the master datastore for an account associated with the particular enterprise network;

providing the request to the destination network function based on determining that the source network function is associated with the particular enterprise network; and blocking the request from propagating to the destination network function based on determining that the source network function is not associated with the particular enterprise network.

16. The one or more non-transitory computer readable storage media of claim 15, wherein determining whether the source network function is associated with the particular enterprise network includes:

extracting the unique user device identifier from the request; and determining whether the unique user device identifier matches a subscriber and account mapping that includes an account identifier for the particular enterprise network stored in the mapping cache.

17. The method of claim 1, wherein the source network function and the destination network function include one or more of a session management function (SMF) or an access and mobility management function (AMF).

18. The method of claim 1, wherein the cloud network includes an Internet of Things (IoT) control center.

19. The apparatus of claim 10, wherein the source network function and the destination network function include one or more of a session management function (SMF) or an access and mobility management function (AMF).

20. The one or more non-transitory computer readable storage media of claim 15, wherein the source network function and the destination network function include one or more of a session management function (SMF) or an access and mobility management function (AMF).

* * * * *